Sept. 20, 1932.    R. H. FORNEY    1,878,690
LATHE CENTER
Filed Oct. 29, 1928

INVENTOR
Ross H. Forney
BY
Jack A. Schley
ATTORNEY

Patented Sept. 20, 1932

1,878,690

UNITED STATES PATENT OFFICE

ROSS H. FORNEY, OF DALLAS, TEXAS

LATHE CENTER

Application filed October 29, 1928. Serial No. 315,663.

This invention relates to new and useful improvements in lathe centers.

One object of the invention is to provide a lathe center so constructed as to be equipped with roller bearings of "standard" size which may be purchased in the open market, as contrasted with similar bearings which must be specially made for the particular tool with which they are used.

Another object of the invention is to provide means for taking up the wear of the bearings, thus making for efficient operation and preventing fractional play of the head which would seriously effect the work of the lathe.

A further object of the invention is to provide a lubricating chamber arranged so as to provide ample lubricant and prevent the leakage of the same.

An important object of the invention is to provide a work supporting head mounted on roller bearings set so as to carry the load at points substantially spaced apart, whereby a more sturdy device is produced; together with a bearing arrangement, whereby end thrust in either direction is fully sustained by said bearings.

A construction designed to carry out the invention will be hereinafter described, together with other features of the invention.

Figure 1:
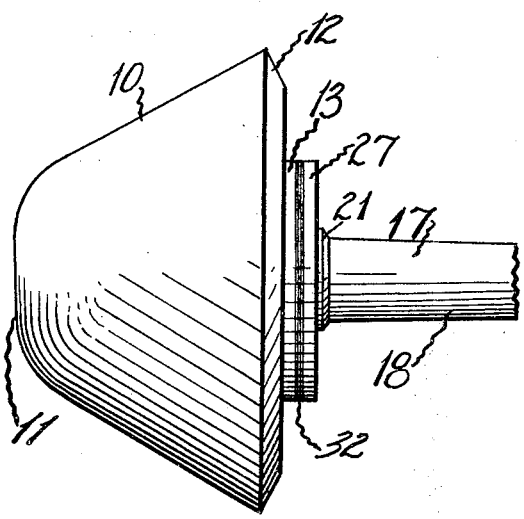
Figure 2:
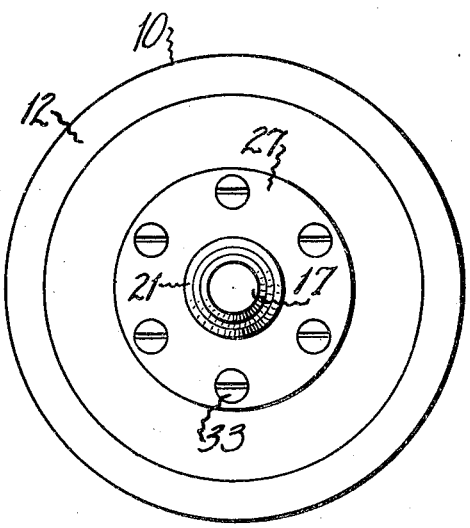
Figure 3:
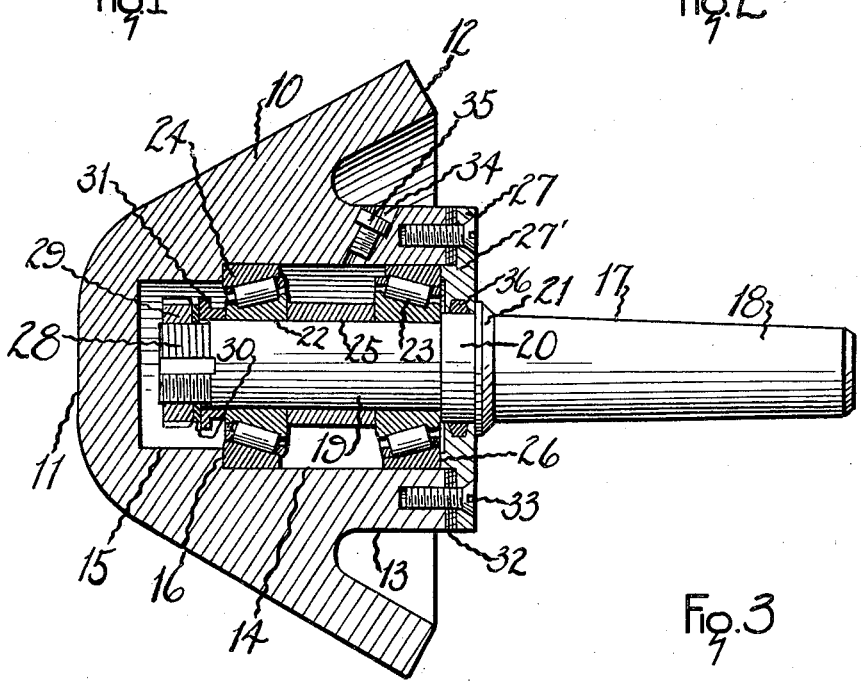

The invention will be more readily understood from a reading of the following specification and by reference to the accompanying drawing, in which an example of the invention is shown, and wherein:

Fig. 1 is an elevation of a lathe center constructed in accordance with the invention, Fig. 2 is a rear elevation of the same, and Fig. 3 is an enlarged longitudinal sectional view.

In the drawing the numeral 10 designates a head of the "bull-nose" type, but the shape is subject to variation within the scope of the invention. I prefer to give the head a blunt central nose 11 with a rearwardly flaring conical body terminating in an annular flange or skirt 12.

The head has a central integral boss or sleeve 13 protruding rearwardly of its skirt and surrounding the axial bore 14 of said head. The bore 14 has a counter-bore 15 at its inner or forward end separated from said bore 14 by an annular shoulder 16. The counter-bore extends to the nose of the head and the bore 14 more than half the length of the head.

A mandrel 17 comprising a tapered shank 18 has a cylindrical spindle 19 extending into the bores 14 and 15. An annular collar 20 and beveled flange 21 separate the shank and spindle. The spindle 19 is somewhat less in diameter than the bores 14 and 15 and receives bearing cones 22 carrying bearing rollers 23 supporting rings 24. The cones are spaced apart a substantial distance by a sleeve 25 fitting snugly on the spindle. The rings 24 fit snugly in the bore 14 and the forward ring abuts the shoulder 16, while the rear ring abuts an annular stop 26 on the boss 27' of a cap ring 27 surrounding the collar 20 contiguous to the flange 21.

The front end of the spindle is reduced and provided with screw threads 28 for receiving a lock nut 29 and a lock washer 30. A shouldered follower 31 fitting on the spindle is forced against the forward cone 22 by the washer 30, whereby the sleeve 25 holds the rear cone against the collar 20. This arrangement securely fastens the cones 22 on the spindle.

The cap ring 27 receives annular shims 32 which surround its boss 27' and bear against the sleeve 13. Screws 33 penetrating the shims fasten the cap ring to the end of said sleeve. It will be observed that the bearing rollers 23 incline in opposite directions, thus taking the end or longitudinal thrust in either direction.

The stop 26 bearing against the rear ring 24 tends to force it against the rear rollers 23 which action, through the agency of the screws 33, draws the head rearwardly, whereby the shoulder 16 crowds the forward ring 24 onto the forward rollers 23. The shims 32 determine drawing action so that by removing one or more shims, which are very thin, wear of the bearings may be readily taken up.

The bores 14 and 15 constitute a lubricant chamber into which lubricating oil may be introduced through a port 34 in the sleeve 13. This port is closed by a screw 35 so that the lubricant is retained. A packing ring 36 seated in the cap 27 embraces the collar 20. This ring, together with the shims 32, effectively close the only openings through which the lubricant might escape.

By this arrangement the bearings are constantly immersed in the lubricant and a very smooth operating device is had.

The shank 18 is inserted in the tail stock of the lathe and pipes or tubes of different diameters may be wedged upon the flared surface of the body of the head 10. The head and the work carried thereby will freely rotate and as the bearings may be kept tight at all times, there will be no lateral or longitudinal play detrimental to the operation of the lathe.

Various changes in the size and shape of the different parts, as well as modifications and alterations, may be made within the scope of the appended claims.

What I claim, is:

1. A lathe center comprising a body terminating in a rearwardly projecting flaring skirt and a rearwardly extending reduced sleeve portion integral with the body and spaced away from the skirt, the bore of the sleeve extending into the body and the exteriors of the body and skirt forming a conical surface, a mandrel having a portion extending into the bore and a plurality of spaced sets of anti-friction bearing means interposed between said portion and the lathe center, the rearward set lying forward of a line from a point in the conical surface at its base and normal to said surface.

2. A lathe center as claimed in claim 1, in which the axes of one set of rollers converge outwardly to take up end thrust.

In testimony whereof I affix my signature.

ROSS H. FORNEY.